(12) United States Patent
Skryten et al.

(10) Patent No.: US 8,295,034 B2
(45) Date of Patent: Oct. 23, 2012

(54) ELECTRIC POWER DISTRIBUTION ARRANGEMENT AND A SWITCHGEAR PROVIDED THEREWITH

(75) Inventors: Paal Kristian Skryten, Skien (NO); Tom-Rune Bjortuft, Porsgrunn (NO); Magne Runde, Trondheim (NO); Thor Endre, Skien (NO)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/095,478

(22) Filed: Apr. 27, 2011

(65) Prior Publication Data
US 2011/0199717 A1 Aug. 18, 2011

Related U.S. Application Data

(63) Continuation of application No. PCT/EP2009/063683, filed on Oct. 19, 2009.

(30) Foreign Application Priority Data

Oct. 27, 2008 (EP) .................................... 08167617

(51) Int. Cl.
*H02B 1/20* (2006.01)
(52) U.S. Cl. .................... 361/611; 361/605; 174/129 R; 174/129 B
(58) Field of Classification Search .................. 361/604, 361/611–612, 618–619, 624; 174/129 R, 174/129 B
See application file for complete search history.

(56) References Cited

U.S. PATENT DOCUMENTS

| 2,156,652 A | 5/1939 | Harris |
| 2,964,586 A | 12/1960 | Sillman |

(Continued)

FOREIGN PATENT DOCUMENTS

| AU | 460912 B2 | 3/1974 |
| FR | 2232112 A3 | 12/1974 |

OTHER PUBLICATIONS

European Search Report; Application No. EP 08 16 7617; Mar. 18, 2009; 5 pages.

(Continued)

*Primary Examiner* — Robert J Hoffberg
(74) *Attorney, Agent, or Firm* — St. Onge Steward Johnston & Reens LLC

(57) ABSTRACT

An electric power distribution arrangement having an electric conductor for carrying a high voltage, a first pair of bodies provided on opposite sides of the conductor as seen in a first direction cross-wise to a longitudinal axis of the conductor, and a second pair of bodies provided on opposite sides of the conductor as seen in a second direction cross-wise to the longitudinal axis. The bodies of the first and second pair of bodies are arranged to be electrically disconnected from the conductor, and the spacing between the bodies of the first pair is larger than the spacing between the bodies of the second pair. At least one of the bodies of at least one of the first and second pair comprises a second current conductor, and at least one of the bodies of at least one of the first and second pair comprises a wall element of an encapsulation inside which the conductor is arranged. In a region in which the conductor is surrounded by the first pair and second pair, the conductor has a substantially oval or substantially elliptical shaped outer periphery, and the cross section of the conductor has a larger dimension in the first direction than in the second direction.

7 Claims, 2 Drawing Sheets

U.S. PATENT DOCUMENTS

| | | | |
|---|---|---|---|
| 3,088,994 A | 5/1963 | Cataldo | |
| 4,536,659 A | 8/1985 | Seitz et al. | |
| 5,171,942 A | 12/1992 | Powers | |
| 5,438,161 A * | 8/1995 | Borchardt et al. | 174/521 |
| 2007/0145822 A1 | 6/2007 | Lopez et al. | |
| 2011/0174779 A1 * | 7/2011 | Lammers et al. | 218/118 |
| 2011/0226528 A1 * | 9/2011 | Endre et al. | 174/70 B |

OTHER PUBLICATIONS

International Preliminary Report on Patentability; PCT/EP2009/063683; Mar. 15, 2011; 8 pages.

International Search Report and Written Opinion of the International Searching Authority; PCT/EP2009/063683; Nov. 17, 2009; 13 pages.

* cited by examiner

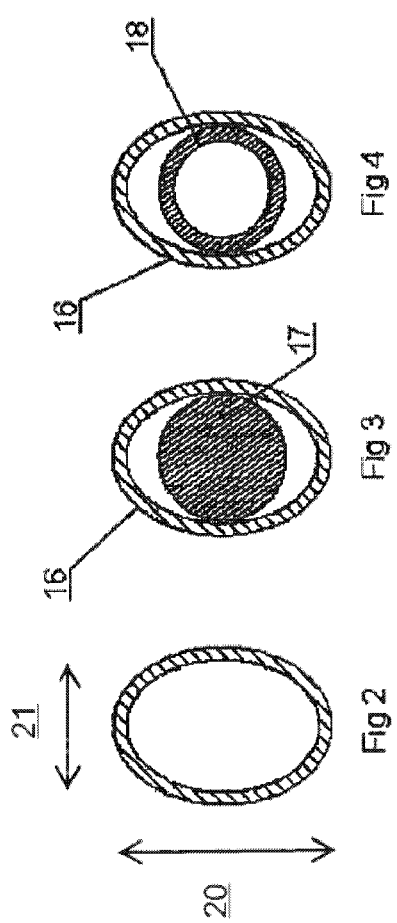

ELECTRIC POWER DISTRIBUTION ARRANGEMENT AND A SWITCHGEAR PROVIDED THEREWITH

CROSS-REFERENCE TO RELATED APPLICATIONS

The present application is a continuation of pending International patent application PCT/EP2009/063683 filed on Oct. 19, 2009 which designates the United States and claims priority from European patent application 08167617.3 filed on Oct. 27, 2008, the content of which is incorporated herein by reference.

FIELD OF THE INVENTION

The present invention relates to an electric power distribution arrangement comprising an electric conductor arranged to carry a high voltage, a first pair of bodies provided on opposite sides of the conductor as seen in a first direction cross-wise to a longitudinal axis of the conductor, and a second pair of bodies provided on opposite sides of the conductor as seen in a second direction cross-wise to a longitudinal axis of the conductor, wherein the bodies of said first and second pair of bodies are arranged so as to be electrically disconnected from said conductor, and wherein the spacing between the bodies of said first pair is larger than the spacing between the bodies of said second pair. At least one of said bodies of at least one of said first and second pair comprises a second current conductor, and at least one of said bodies of at least one of said first and second pair comprises a wall element of an encapsulation inside which the conductor is arranged.

The invention also relates to a switchgear comprising such an arrangement.

Said bodies of said first and second pair of bodies may be interconnected. Typically such a body is formed by a wall element of a grounded encapsulation or by an adjacent electric conductor. During operational conditions the electric conductor is assumed to carry a medium or high voltage, i.e. 1 kV or above, while said bodies are of an electric potential other than that of said electric conductor, advantageously either ground potential or the electric potential of another phase in a three-phase system.

BACKGROUND OF THE INVENTION

Switchgears for the distribution of electric power are well known. In a three-phase system such a switchgear may comprise one or more functional units in a gas filled compartment, each one comprising a grounded enclosure, three bushings connected to three external power cables (one for each phase), three conductors arranged inside the enclosure and in one end connected to a respective bushing and in the opposite end connected to a respective switching device. Each switching device may comprise a breaker (such as a load breaker or vacuum interrupter), possibly in series with a so-called selector switch and connected to a bus bar. It is one bus bar for each phase. Each bus bar extends through all functional units comprised by the gas filled compartment.

In order to reduce or minimize the risk of having electric discharges and short circuits between the voltage-carrying components themselves, i.e. the different phases, or between the voltage-components and the surrounding walls of the encapsulation, the components are positioned at certain minimum distances from each other and from the surrounding walls. The compartment may be filled with a suitable electrically insulating gas, such as SF6.

According to a switchgear design of prior art, the bushings and, accordingly, the conductors connected thereto are arranged in parallel in a horizontal row. Inside the encapsulation there is more space for the conductors in the vertical direction than in the horizontal direction. This has to do with certain other restrictions regarding the switchgear design that need not be further described in this context. According to prior art, the conductors are tubular with a circular outer periphery, which is generally a perfect design in order to promote conductivity as well as to prevent the upcoming of discharges and short circuits. However, for the described switchgear design, the applicant has realised that this conductor design is insufficient for optimising the conducting and voltage-carrying functionality of the conductors and at the same time minimizing the risk of having electric discharges or short circuits between individual conductors or between conductors and surrounding walls. The applicant has also realised that this problem is not only connected to switchgear but to electric power distribution arrangements in general in which there are more restricted space in a first direction than in a second direction cross wise to the longitudinal direction of an electric conductor arranged therein.

It is an object of the present invention to present an electric power distribution arrangement as initially defined, the design of which is such that the risk of having electric discharges or short circuits between individual conductors or between conductors and surrounding walls is reduced or minimized.

SUMMARY OF THE INVENTION

The above-mentioned object is achieved by providing an electric power distribution arrangement comprising
an electric conductor arranged to carry a high voltage,
a first pair of bodies provided on opposite sides of the conductor as seen in a first direction cross-wise to a longitudinal axis of the conductor,
second pair of bodies provided on opposite sides of the conductor as seen in a second direction cross-wise to a longitudinal axis of the conductor,
where the bodies of said first and second pair of bodies are arranged so as to be electrically disconnected from said conductor, and where the spacing between the bodies of said first pair is larger than the spacing between the bodies of said second pair,
at least one of said bodies of at least one of said first and second pair comprising a second current conductor, and
at least one of said bodies of at least one of said first and second pair comprising a wall element of an encapsulation inside which the conductor is arranged, wherein, in a region in which said conductor is surrounded by said first pair and second pair,
said conductor has a substantially oval or substantially elliptical shaped outer periphery, and where
the cross section of said conductor has a larger dimension in the first direction than in the second direction.

By the present invention, the risk of having electric discharges or short circuits between individual conductors or between conductors and surrounding walls is radically reduced or minimized. By a substantially oval or substantially elliptical shaped outer periphery is meant that the outer periphery has a substantially oval or substantially elliptical cross-section. The outer conductor periphery should be free from edges, since the latter would form initial points of discharges. Accordingly, strictly rectangular outer peripheries are excluded from the scope of the invention. However, elliptic, oval or other similar shapes are advantageous and within the scope of the invention.

According to an advantageous embodiment of the electric power distribution arrangement according to the present invention, the conductor has a tubular cross section. Such a design is advantageous when the conductivity of the conductor is to be optimised. The outer periphery of a tube thereby defined by the conductor should have the features as previously described for the conductor. Advantageously, the wall thickness of the tube is the same all over a given cross-section thereof.

According to an alternative embodiment of the electric power distribution arrangement according to the present invention, the conductor comprises a tubular part and a main current-conducting part located inside and in electric contact with said tubular part. Thereby, the main current-conducting part may be made of a material optimised with regard to its electric conductivity but of less ductility. The main current-conductor may be given a circular or other suitable cross-section that makes it easier to bend and shape as required in order to fit in a specific application. The outer tubular part on the other hand may be made of a material that is more ductile and more readily bent or shaped into a required shape. Accordingly, as a further development of this feature, the materials of said tubular part and the main current-conductor are different. Advantageously, the material of the main current-conductor presents a higher electric conductivity, while the material of the tubular part is the more ductile one. It should, however, be emphasized that the tubular part, though not being the main carrier of electric current will carry the same voltage as the main current-conductor.

According to a further advantageous embodiment of the electric power distribution arrangement according to the present invention, the main current-conducting part presents a circular outer periphery.

According to another advantageous embodiment of the electric power distribution arrangement according to the present invention, the main current-conducting part presents a circular cross section.

According to an advantageous embodiment of the electric power distribution arrangement according to the present invention, the main current-conducting part presents a tubular cross-section. Advantageously, the outer periphery as well as the inner periphery of said part is circular.

According to the present invention, at least one of said bodies of at least one of said first and second pair comprises a second current conductor. Typically the second current conductor is a conductor carrying the voltage of another phase in a three-phase system to which both the first and the second conductor belong.

According to the present invention, at least one of said bodies of at least one of said first and second pair comprises a wall element of an encapsulation inside which the conductor is arranged. Typically such encapsulation is grounded. According to an advantageous embodiment of the electric power distribution arrangement according to the present invention, at least one of said bodies may be a switching device (breaker or selector switch) to which the conductor itself or an adjacent conductor is electrically connected. By this embodiment, the risk of having electric discharges or short circuits between individual conductors or between conductors and surrounding walls is further reduced or minimized.

According to yet another advantageous embodiment of the electric power distribution arrangement according to the present invention, the electric power distribution arrangement comprises a plurality of at least partly parallel adjacent electric conductors arranged inside a grounded encapsulation.

According to still another advantageous embodiment of the electric power distribution arrangement according to the present invention, the electric power distribution arrangement comprises an encapsulation, a bushing and a switching device, wherein the current conductor is connected to the bushing in one end and to the switching device in another end.

The object of the invention is also achieved by means of a switchgear, characterised in that it comprises an electric power distribution arrangement according to the invention. By this switchgear, the risk of having electric discharges or short circuits between individual conductors or between conductors and surrounding walls is radically reduced or minimized.

BRIEF DESCRIPTION OF THE DRAWINGS

Embodiments of the invention will now be described more in detail with reference to the annexed drawing, on which, FIGS. 2-4 are cross sections of different embodiments of the conductor according to the invention.

DETAILED DESCRIPTION OF THE INVENTION

Figure 1:
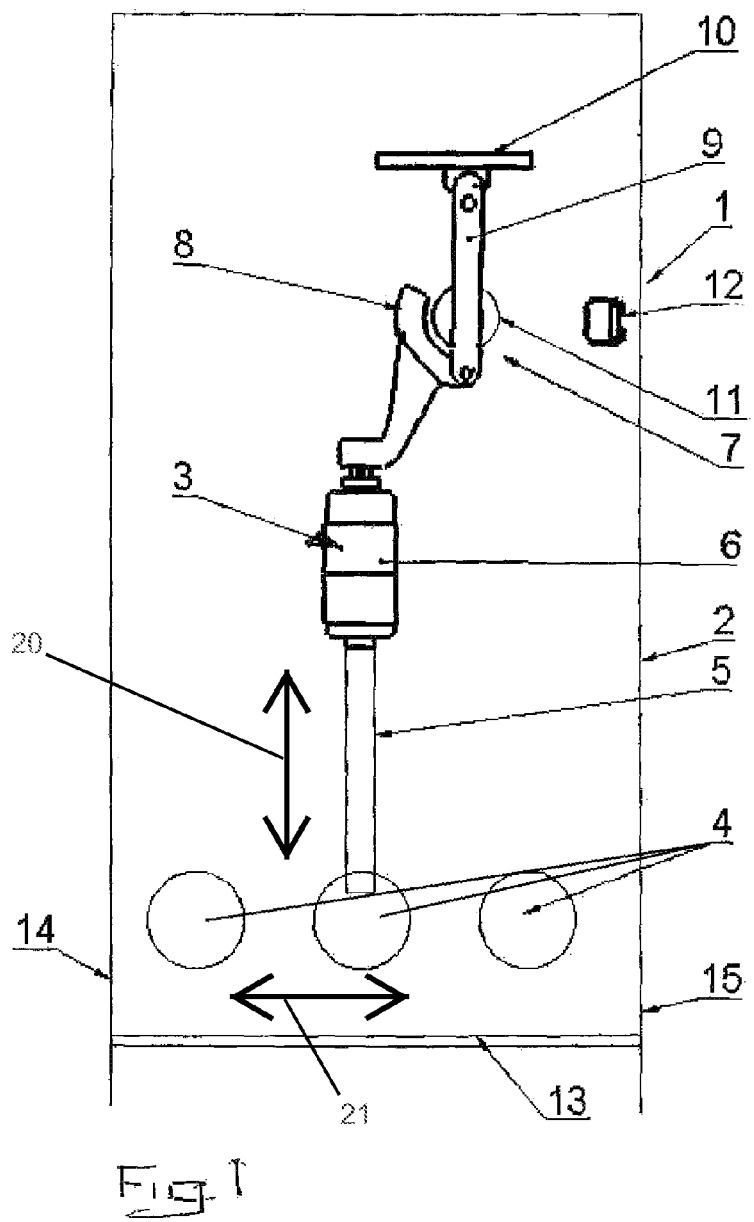
FIG. 1 is a side view of a part of the interior of a switchgear provided with a switching device according to the invention.

FIG. 1 shows an electric power distribution switchgear 1 according to the invention. The switchgear 1 comprises a gas filled compartment 2 of metal inside which a number of switching devices 3, only one of which is shown in the figure, are housed. Solutions with more than one compartment, e.g. one for each switching device, are also conceivable and within the scope of the invention. The switching devices not shown in the figure are arranged in parallel with the one shown and are thus either hidden behind the one shown or located in planes in front of the latter and not shown in the figure. A wall of the encapsulation 2 is penetrated by a number of bushings 4, one for each phase of a plural phase system. From each bushing 4 a respective conductor 5, only one of which is shown in the figure, extends to a respective switching device 3. On the outside of the encapsulation 2 the bushings 4 are connected to cables, not shown, that either connect the switchgear 1 to a load or to a medium or high voltage power distribution line.

Each switching device 3 according to the invention comprises a breaker 6 connected in one end to the conductor 5 that extends from a dedicated bushing 4, and in another end to a switch 7. The breaker 6 is a vacuum interrupter that, though not shown in the drawing but as known per se, has a fixed part and a moveable part, wherein the fixed part is connected the conductor 5 and the moveable part is connected to the switch. The switch 7 is a so called safety switch or selector switch which is not adapted to break a medium or high voltage circuit itself but only to disconnect the breaker from a medium or high voltage line after breaking has been performed by means of the breaker. The switch 7 comprises a contact element 8 permanently connected to the breaker 6, and a switch element 9. The switch element is movable between positions in which it connects the breaker 6 with a further conductor 10 formed by a so called bus bar that extends through the switchgear 1, with ground or an open position in which the breaker is neither connected to the bus bar nor to the ground. The reasons to why these positions are used during operation of the switchgear are well known to persons skilled in the art and will, therefore, not be further described here.

It should be understood that a switchgear may comprise a plurality of switchgears, or units, such as the one described above. For each electric phase there is a common bus bar, like the conductor 10 defined above, that extends from unit to unit. The encapsulation may or may not be common for the plurality of switchgears/units. The encapsulation may be filled with an electrically insulating gas, which, advantageously, is pressurised. Air-filled encapsulations are also conceived.

The switching device comprises a shaft 11 onto which the switch element 9 is attached. The shaft 11 is common for the parallel three switches 7 of the three-phase switchgear described so far. The shaft 11 extends through a wall of the encapsulation 2 and is manoeuvrable from outside the encapsulation 2. The bus bar 10 extends horizontally in an upper part of the compartment defined by the encapsulation 2, and there is provided a grounded element 12 on an inner wall of the encapsulation 2, below the level of the bus bar.

From the point at which they are attached to the bushings 4, the conductors 5 extend a predetermined distance beside each other, in a generally horizontal direction in the embodiment shown in FIG. 1. Each conductor then follows a curve path to its respective breaker 6. According to the general teaching of the invention a first pair of bodies are provided on opposite sides of each conductor as seen in a first direction 20 on a longitudinal axis of the conductor, the longitudinal axis along a plane between the first pair of bodies, and a second pair of bodies are provided on opposite sides of the conductor as seen in a second direction 21 cross-wise to a longitudinal axis of the conductor, wherein the bodies of said first and second pair of bodies are arranged so as to be electrically disconnected from said conductor, and wherein the spacing between the bodies of said first pair is larger than the spacing between the bodies of said second pair. This teaching is particularly applicable to the region mentioned above. Here, in said region, said first pair of bodies is formed by the breaker 6 and the floor 13 of the encapsulation 2. For the outermost ones of the conductors 5, the second pair of bodies is formed by an adjacent conductor of other electric phase and a lateral wall 14, 15 of the grounded encapsulation 2.

In order to provide for a highest possible dielectric strength, i.e. to prevent the upcoming of discharges and short circuits between each of the conductors 5 and its neighbouring bodies, each conductor 5 has an outer periphery that is free from edges, and where the cross section of said conductor 5 has a larger dimension in the first direction than in the second direction. In the embodiment of FIG. 1, the first dimension is a vertical direction, while the second dimension is a horizontal direction.

FIG. 2 shows a first embodiment of a cross-section of a conductor 5 suitable to interconnect a bushing 4 with a breaker in a switchgear as described so far. The conductor 5 is tubular and the cross section thereof has an elliptic outer periphery and an elliptic inner periphery.

FIG. 3 shows a second embodiment of a cross-section of a conductor 5 according to the invention. The conductor 5 comprises a tubular part 16 and a main current-conducting part 17 located inside and in electric contact with said tubular part 16. The cross section of the tubular part 16 has an elliptic outer periphery and an elliptic inner periphery. The cross section of the main current-conducting part 17 has a circular outer periphery, said part 17 being rod-shaped. The main current-conducting part may be made of a material optimised with regard to its electric conductivity but of less ductility. The main current-conductor 17 has a cross-section that makes it easier to bend and shape as required in order to fit in a specific application. The outer tubular part 16 on the other hand may be made of a material that is more ductile and more readily bent or shaped into a required shape. Accordingly, as a further development of this feature, the materials of said tubular part 16 and the main current-conductor 17 are different. Advantageously, the material of the main current-conductor 17 presents a higher electric conductivity, while the material of the tubular part 16 is the more ductile one.

FIG. 4 shows yet another embodiment, which differs from the one shown in FIG. 3 in that the main current-conducting inner part 18 is tubular. Accordingly, the cross section of the said part 18 has a circular outer periphery and a circular inner periphery. Also for this embodiment the material of the main current-conductor 18 presents a higher electric conductivity, while the material of the tubular part 16 is the more ductile one.

It should be understood that the above description of embodiments is only made by way of example and that a plurality of alternative solutions will be obvious for a person skilled in the art without thereby going beyond the scope of protection defined by the annexed claims.

For example, an alternative to elliptic cross-sections may be oval shapes or other similar shapes. For example, an alternative to elliptical shaped outer peripheries may be oval shaped outer peripheries or other similar shapes.

What is claimed is:

1. An electric power distribution switchgear comprising:
a grounded encapsulation,
a plurality of at least partly parallel adjacent electric conductors arranged inside the grounded encapsulation and arranged to carry a high voltage,
a first pair of bodies provided on opposite sides of a portion of a first conductor of the plurality of electric conductors as seen in a first direction,
a second pair of bodies provided on opposite sides of the portion of the first conductor as seen in a second direction, the second direction substantially orthogonal to the first direction,
wherein said second pair of bodies are arranged so as to be electrically disconnected from the first conductor, and wherein a spacing between the first pair of bodies is larger than a spacing between the second pair of bodies,
a first body of said second pair of bodies comprising a second conductor of the plurality of electric conductors,
a second body of said second pair of bodies comprising a lateral wall element of the ground encapsulation, and
a third body of said first pair of bodies comprising a switching device to which the first conductor or an adjacent conductor of the plurality of electric conductors is electrically connectable,
characterised in that, in the portion of the first conductor in which said first conductor is surrounded by said first pair and second pair of bodies,
a cross section of said first conductor has a substantially oval or substantially elliptical shaped outer periphery, and
the cross section of said first conductor has a larger dimension in the first direction than in the second direction.

2. The switchgear according to claim 1, characterised in that the cross section of the first conductor has a tubular cross section.

3. The switchgear according to claim 1, characterised in that the first conductor comprises a tubular part and a main current-conducting part located inside and in electric contact with said tubular part.

4. The switchgear according to claim 3, characterised in that a cross section of the main current-conducting part presents a circular cross section.

5. The switchgear according to claim 3, characterised in that a cross section of the main current-conducting part presents a tubular cross-section.

6. The switchgear according to claim 1, characterised in that the first conductor is connected to a bushing on one end of the first conductor and to the switching device on another end of the first conductor.

7. The switchgear according to claim 1, characterised in that a fourth body of said first pair of bodies comprises a floor element of the grounded encapsulation.

* * * * *